United States Patent Office 3,498,843
Patented Mar. 3, 1970

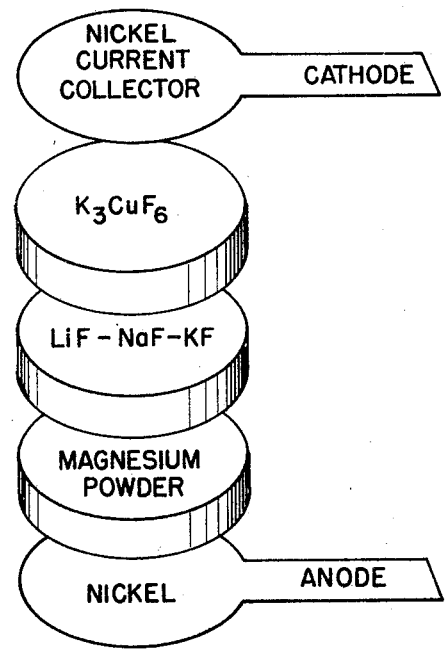
John B. Hunt
Charles B. Root
INVENTORS

3,498,843
ELECTROCHEMICAL CELLS FOR THERMAL BATTERIES HAVING TRANSITION METAL FLUORIDE CATHODE AND AN ALKALI METAL FLUORIDE ELECTROLYTE
John B. Hunt, Hyattsville, and Charles B. Root, Silver Spring, Md., assignors to the United States of America as represented by the Secretary of the Navy
Filed Sept. 25, 1968, Ser. No. 762,465
Int. Cl. H01m *11/00, 43/06*
U.S. Cl. 136—83        8 Claims

ABSTRACT OF THE DISCLOSURE

Electrochemical cells for construction of thermal batteries formed of three layers of pressed pellets, the first one of which is composed of a transition metal fluoride material, the second one of which is an alkali metal fluoride electrolyte mixture and the third one of which is an electrochemically active metal.

---

This invention relates to thermal batteries and more particularly to electrochemical cells for thermal batteries.

Batteries have been employed for many years. Recently, thermal batteries, i.e. batteries which employ solid melt electrolyte systems and which are activated by heat, have found considerable application, especially in those areas where a reliable source of a large amount of electrical energy, after extended storage of the battery, is needed for only a relatively short time.

The thermal batteries presently in use employ electrochemical cells which include transition metal oxide cathode materials, such as copper oxide, tungsten oxide or vanadium oxide, magnesium anodes and molten lithium chloride/potassium chloride as the electrolyte material. These batteries, however, have not been found to be entirely satisfactory since they tend to break down before their job is completed. There is, therefore, a great need for thermal batteries, which can supply large amounts of energy, for longer durations than heretofore attained, particularly in the area of modern weaponry.

Basically, there are at least two reasons for these afore-noted deficiencies of the prior art thermal batteries. Firstly, the metal oxide cathode materials employed react during discharge to form insoluble oxide compound products, which coat and insulate the cathode electrode, thereby terminating the desired electrochemical processes and causing the battery to prematurely die. For example, when vanadium pentoxide ($V_2O_5$) is used as the cathode material, $V^{+5}$ ions undergo a reduction to the $V^{+4}$ ion state. These ions ($V^{+4}$) and $Li^{+1}$ ions, which exist in the molten electrolyte, react with any available oxygen ($O^{-2}$) ions to form insoluble oxides, such as $Li_2O \cdot V_2O_4$, commonly known as vanadium bronzes. These insoluble oxides interfere with the desired electrochemical processes by coating the cathode and thereby causing the battery to prematurely stop functioning.

Secondly, chloride ions ($Cl^-$) present in the molten lithium chloride/potassium chloride electrolyte used are not very stable and relatively easily oxidize to chlorine gas by many high energy cathode materials. This can be extremely detrimental to the efficient operation of the battery since for one, an excessive buildup of the gas in the sealed battery can cause the battery to explode. Moreover, the wasteful use of cathodic material to produce chemical compounds rather than electrical energy is obviously undesirable. The electrochemical cells therefore, of the prior art thermal batteries have of necessity, been composed of only those cathodic materials which will not oxidize chloride ion to any appreciable extent and thereby have not used many high-energy-density, high-oxidation-state cathodic materials which might otherwise contribute to more efficient thermal battery operation.

SUMMARY OF THE INVENTION

Accordingly, it is an object of this invention to provide new high energy electrochemical cells for use in thermal batteries which do not react during discharge to form detrimental insoluble products.

It is a further object of this invention to provide new high energy electrochemical cells for use in thermal batteries which permit the use of high-energy-density, high-oxidation-state cathodic materials, such as would ordinarily spontaneously oxidize a molten chloride, and capable of undergoing multielectron reduction.

It is still a further object of this invention to provide electrochemical cells for thermal batteries, which are characterized by high-energy-density, reliability, and a long operating life.

Generally, the foregoing and other objects are attained by an electrochemical cell employing either a mixed alkali metal fluoride, a mixed alkaline earth metal fluoride or a mixed alkali metal-alkaline earth metal fluoride electrolyte material and a transition metal fluoride as the cathode material with any of the commonly employed cathodic electrode and anodic electrode materials used to complete the system.

BRIEF DESCRIPTION OF THE DRAWING

The sole figure is an expanded perspective view of an electrochemical cell according to the present invention.

DESCRIPTION OF THE PREFERRED EMBODIMENTS

The electrochemical cells according to this invention are based on the use of alkali or alkaline earth metal fluoride mixtures as the electrolyte material, thus permitting the employment of new high-oxidation-state cathode materials which spontaneously oxidize a molten chloride, but do not oxidize the more stable molten fluoride. Although the preferred fluoride mixture is the eutectic mixture of LiF-NaF-KF (M.P. 458° C.), containing 42 mole percent KF, 46.5 mole percent LiF and remainder NaF, commonly known as Flinak, any alkali metal, alkaline earth metal or alkali-alkaline earth metal fluoride mixture capable of attaining a molten state, such as those disclosed in a report by P. V. Clark entitled Physical Properties of Fused Salt Mixtures, volumes 1 and 2, Sandia Laboratory, Albuquerque (1966), SC–R–65–930, may be employed. Some of the other fluoride mixtures are e.g. KF-NaF eutectic (M.P. 700° C.) containing 59.5 mole percent KF, remainder NaF, $CaF_2$-KF-LiF eutectic (M.P. 490° C.) containing 2.3 mole percent $CaF_2$, 48.6 mole percent KF and 49.1 mole percent LiF, and KF-LiF eutectic (M.P. 475° C.) containing 50 mole percent KF and 50 mole percent LiF.

The cathode materials to be employed are stable in the presence of a molten fluoride and are able to undergo multielectron reduction to products which do not limit cell performance. Among the compounds which have been found to be the most promising are high-oxidation-state fluoride compounds of the transition metals such as potassium hexafluorocuprate (III), $K_3CuF_6$, potassium hexafluoromanganate (IV), $K_2MnF_6$, potassium tetrafluoroargentate (III), $KAgF_4$, potassium hexafluoronickelate (III), $K_3NiF_6$, potassium hexafluorovanadate (IV), $K_2VF_6$, potassium hexafluorochromate (IV) $K_2CrF_6$, potassium hexafluoroferrate (III), $K_3FeF_6$, vanadium tetrafluoride, $VF_4$, vanadium trifluoride, $VF_3$, chromium trifluoride, $CrF_3$, Ferric trifluoride, $FeF_3$, cobalt trifluoride, $CoF_3$, cupric difluoride, $CuF_2$, silver difluoride, $AgF_2$ and sodium hexafluorocuprate (III), $Na_3CuF_6$. While most of these materials are commercially available, all of them may be prepared by well known and conventional methods. Almost any electrochemically inert metal such as silver, gold, platinum, copper or nickel may be used as the cathodic electrode. Magnesium is the preferred anode material, although other electrochemically active metals such as calcium, potassium, sodium or lithium may also be used.

Since thermal batteries used in military applications are oftentime subject to high speed spinning and high gravitational forces, an immobilizing material may be added to further insure against the molten salts running through the battery.

It is to be understood that thermal batteries may be constructed of a single or plurality of electrochemical cells according to this invention, preferably in the form shown in the solitary figure which illustrates a three-layer, pressed-pellet cell of the type found in some existing thermal batteries, however employing the materials of the present invention. The amounts of materials used in this cell may vary over a wide range. For example the magnesium may be used in amounts ranging from 15 to 50 percent of the total weight of the pellets, whereas the LiF-NaF-KF electrolyte mixture may vary from 25 to 40 percent of the total weight of the pellets. The $K_3CuF_6$ cathode material may be employed in amounts ranging from 25 to 60 percent of the total weight of the pellets. Preferably, though, the cells include approximately 1.05 grams of magnesium, approximately 1.4 grams of LiF-NaF-KF, and approximately 1.9 grams $K_3CuF_6$. Obviously, any of the hereinbefore identified cathode materials, cathodic electrode, anodic electrode and electrolyte materials of the present invention may be respectively substituted for the materials identified in the solitary figure.

The general nature of the invention having been set forth, the following examples are presented as specific illustrations thereof. It will be understood that the invention is not limited to these examples but is susceptible to various modifications that will be recognized by one of ordinary skill in the art.

EXAMPLE I

An electrochemical test cell wherein the anode is of magnesium metal, the cathode of copper metal, the electrolyte of molten lithium fluoride/sodium fluoride/potassium fluoride eutectic at ca. 500° C. and the cathode material of potassium fluorocuprate (III), $K_3CuF_6$, yields an open circuit voltage of 2.8 v. and 1.8 v. with a 5 ohm load. The cell operated with this load for approximately 5 minutes before a significant voltage drop was observed. The calculated anode and cathode current densities are approximately 360 ma./cm.² at 1.8 v. The electrochemical reaction occurring seems to be the reduction of copper (III) ions from the dissolved $K_3CuF_6$ at the copper metal electrode. The copper electrode is not consumed during discharge of the cell. A second test cell gave similar results operating under an inert atmosphere of argon, thus eliminating the possibility that atmospheric oxygen is taking part in the cell reaction. Moreover, the substitution of platinum wire for the copper electrode results in no appreciable change in performance, thereby indicating that this electrode is essentially inert in the cell reaction.

EXAMPLE II

A cell employing nickel instead of copper for the cathode electrode, and commercially prepared silver difluoride (presumably contained some silver (III) compound) as cathode material shows 3.2 volts open circuit and approximately 0.9 volt at 10 ohm load.

EXAMPLE III

After loading each test cell with the LiF-Na-KF eutectic and cathode material mixture, the cell is rapidly heated to 500° C. and the voltage determined across an open circuit and a five ohm load. The open circuit voltages are as follows: $FeF_3$:2.3 v.; $CrF_3$:2.3 v.; $VF_4$:2.4 v.; $MnF_3$: 2.5 v.; $K_2MnF_6$:2.5 v.; $CuF_2$:2.6 v.; $K_3CuF_6$:2.8 v.; $AgF_2$:3.2 v. The cells employing potassium hexafluorocuprate (III), $K_3CuF_6$, silver (II) fluoride, $AgF_2$ and vanaduim (IV) fluoride, $VF_4$ show appreciable voltage under load. The fluorocuprate (III) cathode is able to maintain 1.8 volts under load for over five minutes before a 10 percent drop in voltage. The silver (II) difluoride and vanadium (IV) fluoride show 1.6 and 2.5 volts, respectively, under load. When the voltage of the fluorocuprate (III) or silver (II) fluoride cells starts to drop, it is possible to restore the voltage to its original value by adding more cathode to the molten electrolyte.

EXAMPLE IV

Three-layer, pressed-pellet test cells for use in thermal batteries were constructed and tested. The cells were activated by placing them between the plates of a heated anvil (500° C.). Voltage versus time at constant resistance was recorded.

The average performance of a system of the present invention compared to that of a conventional thermal battery cell constructed the same way but employing vanadium pentoxide as the cathode and LiCl/KCl eutectic as the electrolyte is given in Table I.

TABLE I.—TEST CELL PERFORMANCE; SIMULATED THERMAL BATTERY CONFIGURATION

|  | Conventional system, $Mg/LiCl-KCl/ V_2O_5$ | Fluoride system, $Mg/LiF-NaF-KF/K_3CuF_6$ | |
| --- | --- | --- | --- |
| Current density, (ma./cm.²) | 25 | 21 | 155 |
| Voltage | 2.7 | 2.2 | 1.7 |
| Life (80% to 80%), (min.) | 2.2 | 12 | 4 |

The data in Table I clearly indicates the superior efficiency of the fluoride system of the present invention over the conventional system of the prior art. The operating life from initial 80 percent of peak voltage to final 80 percent of peak voltage of the fluoride system at a current density of 21 ma./cm.² is more than several times better than the conventionl system of the prior art at a comparable current density. Moreover, at a current density more than six times greater than the current density of the conventional system shown in the table, the fluoride system of the present invention still operates almost twice as long as the system of the prior art. This is obviously very advantageous in those areas employing thermal batteries where a high amperage or current density is required, but yet where a somewhat longer operational life than the conventional system allows is desired.

As will be evident to those skilled in the art, various modifications can be made in light of the foregoing disclosure without departing from the scope and spirit thereof.

What is claimed and desired to be secured by Letters Patent of the United States is:

1. An electrochemical cell comprising an electrochemically active metal anode, a transition metal fluoride cathode and an electrolyte selected from the group consisting of a mixture of alkali metal fluorides, alkaline earth metal fluorides and alkali metal-alkaline earth metal fluorides in contact with said anode and cathode.

2. The electrochemical cell of claim 1 wherein said mixture of alkali metal fluorides is LiF-NaF-KF eutectic.

3. The electrochemical cell of claim 1 wherein said transition metal fluoride cathode is selected from the group consisting of $K_3CuF_6$, $K_2MnF_6$, $KAgF_4$, $K_3NiF_6$, $K_2VF_6$, $K_2CrF_6$, $K_3FeF_6$, $VF_4$, $VF_3$, $CrF_3$, $FeF_3$, $CoF_3$, $CuF_2$, $AgF_2$ and $Na_3CuF_6$.

4. The electrochemical cell of claim 1 wherein said transition metal cathode is $K_3CuF_6$.

5. An electrochemical cell comprising three layers of pressed pellets, a first one of said pellets being composed of a transition metal fluoride compound, a second one being composed of an electrolyte material selected from the group consisting of a mixture of alkali metal fluorides, alkaline earth metal fluorides and alkali metal-alkaline earth metal fluorides, the third pellet being composed of an electrochemically active metal and means for providing an output for said cell.

6. The electrochemical cell of claim 5 wherein said mixture of alkali metal fluorides is LiF-NaF-KF eutectic.

7. The electrochemical cell of claim 5 wherein said transition metal fluoride compound is selected from the group consisting of $K_3CuF_6$, $Na_3CuF_6$, $K_2MnF_6$, $KAgF_4$, $K_3NiF_6$, $K_2VF_6$, $K_2CrF_6$, $K_3FeF_6$, $VF_4$, $VF_3$, $CrF_3$, $FeF_3$, $CoF_3$, $CuF_2$, and $AgF_2$.

8. The electrochemical cell of claim 7 wherein the transition metal fluoride compound is $K_3CuF_6$.

References Cited

UNITED STATES PATENTS

| | | | |
|---|---|---|---|
| 2,928,890 | 3/1960 | Van Der Grinten et al. | 136—83 |
| 3,079,454 | 2/1963 | McGinnis | 136—153 XR |
| 3,186,875 | 6/1965 | Freeman | 136—83 XR |
| 3,318,734 | 5/1967 | McCully | 136—6 |

ALLEN B. CURTIS, Primary Examiner

A. SKAPARS, Assistant Examiner

U.S. Cl. X.R.

136—155